United States Patent
Bernard et al.

(10) Patent No.: US 6,858,668 B2
(45) Date of Patent: Feb. 22, 2005

(54) METHOD FOR MASKING POLYISOCYANATES IN EMULSION

(75) Inventors: Jean-Marie Bernard, Mornant (FR); Jean-Pierre Corbet, Le Pecq (FR); Minou Nabavi, Paris (FR); Philippe Galy-Jammou, Lyons (FR); Denis Revelant, Genas (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/486,343

(22) PCT Filed: Aug. 27, 1998

(86) PCT No.: PCT/FR98/01862

§ 371 (c)(1),
(2), (4) Date: Jun. 9, 2000

(87) PCT Pub. No.: WO99/10402

PCT Pub. Date: Mar. 4, 1999

(65) Prior Publication Data

US 2003/0149168 A1 Aug. 7, 2003

(30) Foreign Application Priority Data

Aug. 27, 1997 (FR) ............................................ 97 10717
Aug. 27, 1997 (FR) ............................................ 97 10716
Nov. 7, 1997 (FR) ............................................ 97 14059

(51) Int. Cl.[7] .............................. C08J 3/00; C08K 3/20; C08L 75/00; C08G 18/81; B01J 10/00

(52) U.S. Cl. .................... 524/591; 422/129; 422/132; 422/134; 422/135; 427/372.2; 427/385.5; 428/423.1; 523/223; 523/322; 523/323; 523/333; 523/334; 524/589; 524/590; 524/839; 524/840; 528/45

(58) Field of Search ................................ 524/589, 590, 524/591, 839, 840; 528/45; 523/223, 322, 323, 333, 334; 428/423.1; 427/372.2, 385.5; 422/129, 132, 134, 135

(56) References Cited

U.S. PATENT DOCUMENTS

| | | | | |
|---|---|---|---|---|
| 4,303,774 A | * | 12/1981 | Nachtkamp et al. | 528/71 |
| 4,396,738 A | | 8/1983 | Powell et al. | |
| 4,879,322 A | * | 11/1989 | Markusch et al. | 523/322 |
| 5,037,864 A | * | 8/1991 | Anand et al. | 523/348 |
| 5,300,556 A | | 4/1994 | Tirpak et al. | |

FOREIGN PATENT DOCUMENTS

| | | |
|---|---|---|
| CA | 2139365 | 7/1995 |
| EP | 0 004 927 | 10/1979 |
| EP | 0 367 667 | 5/1990 |
| EP | 0 524 511 | 1/1993 |
| EP | 0 566 953 | 10/1993 |
| WO | 94 22935 | 10/1994 |
| WO | 97 31960 | 9/1997 |
| WO | 97 12924 | 10/1997 |

* cited by examiner

Primary Examiner—Patrick D. Niland
(74) Attorney, Agent, or Firm—Burns, Doane, Swecker & Mathis, L.L.P.

(57) ABSTRACT

This invention relates to a process for the preparation of aqueous emulsions of blocked (poly)isocyanates, this process comprising the steps consisting successively in:

a) placing an isocyanate composition containing free isocyanate functions in contact with at least one blocking agent A in the presence of a surfactant B and an aqueous phase, the said isocyanate composition being added gradually to a stock containing at least some of the aqueous phase and at least some of the blocking agent;

and optionally, b) subjecting the mixture obtained to a shear (speed gradient) of greater than 1000 $s^{-1}$, preferably greater than 20,000 $s^{-1}$ and less than 1,000,000 $s^{-1}$, preferably less than 200,000 $s^{-1}$, and c) repeating step b), optionally after step a) has been repeated, until a stable emulsion is obtained whose particles have a Sauter diameter of greater than 0.1 μm, preferably 0.2 μm, and less than 5 μm, preferably less than 2 μm, and a dispersion width of less than 5 μm.

110 Claims, No Drawings

METHOD FOR MASKING POLYISOCYANATES IN EMULSION

The present invention relates to a process for the emulsion synthesis of blocked (poly)isocyanates, to the emulsions thus obtained, to their use in order to make compositions which are useful for coating surfaces and to the coatings thus obtained.

In order to give a better understanding of the invention it appeared appropriate to make the following reminders.

In the present description, the particle size characteristics often refer to notations of the type $d_n$ in which n is a number from 1 to 99. This notation is well known in many technical fields, but is slightly rarer in chemistry, and it may thus be useful to recall its meaning. This notation represents the particle size such that n % (by weight, or more exactly by mass) of the particles are less than or equal to the said size.

In the description hereinbelow, the polydispersity index will be used, which is defined as $$I=(d_{90}-d_{10})/d_{50}$$

In the activity of paints and varnishes, diisocyanates are widely used, in particular alkylene diisocyanates (especially those sold under the brand Tolonate®) and derivatives thereof of biuret type or trimers thereof.

However, among the problems which remain incompletely solved to date, one of the most disturbing remains the use of organic solvent, the presence of which is reputed to be toxic and harmful to the environment.

Usually, in order to obtain films of paint or varnish while avoiding or reducing the use of solvent(s), a dispersion of two main components is prepared: an emulsion containing the isocyanate, which can be blocked, and a dispersion of polyol.

The mixture of the dispersions, which can also contain pigments and fillers, is then applied to a support in the form of a film with the aid of the standard techniques for using industrial paints. When the preparation contains blocked (the term masked is occasionally used) isocyanates, the film plus support assembly is cured at a temperature which is sufficient to release the isocyanate functions and couple them with reactive hydrogen groups, usually the hydroxyl groups of the polyol particles.

The use of organic solvents is increasingly being criticized by the authorities in charge of safety at work, since these solvents, or at least some of them, are reputed to be toxic or chronotoxic. For this reason, efforts are being made to develop more and more techniques which reduce the use of solvents, or even which replace the solvent-medium techniques in order to overcome the drawbacks associated with solvents.

One of the solutions most frequently used lies in the use of emulsions or dispersions in water. On account of the reactivity of water with isocyanates, this solution is especially used for blocked isocyanates.

Hitherto, the preparation of emulsions or dispersions was both long and expensive. It often involved large amounts of solvents, which amounts to displacing the use of solvents rather than reducing it.

The emulsification is itself often difficult and has led to the development of specific techniques to obtain physically stable emulsions (see in particular PCT patent application No. PCT/FR94/00353 published under No. WO 94/22935).

European patent application No. 524,511 describes a technique which consists in emulsifying the isocyanate and carrying out the blocking reaction [using the product denoted by the acronym "MEKO" (methylethylketoxime or, more precisely, 2-butanoxime)] on the emulsion thus formed.

In that application, it is pointed out that the oxime is more reactive than water towards the isocyanate functions. This assertion constitutes ambiguous and very incomplete teaching, since the Applicant's studies have shown that the reaction with water was thermodynamically at least as favourable (and probably much more so), that the brake was of kinetic order and that a large number of common conditions led to an appreciable evolution of gas (carbon dioxide).

Thus, among the parameters leading to or working towards an increased risk of an interfering reaction with water, mention may be made of a low water content, a temperature above room temperature, the presence of ionic surfactant and high-shear stirring, i.e. stirring which renews the surface of the emulsion particles.

The result obtained is not only not entirely convincing, since the effective blocking yield is generally only about 90% (i.e. a 10% loss of isocyanate function), but is also acquired at the price of considerable drawbacks, namely slow kinetics and the use of an enormous amount of surfactant (50% by mass), this surfactant being both nonionic and grafted.

In addition, it should be pointed out that the reactivity of aromatic isocyanates (i.e. those in which the isocyanate function is directly grafted onto an aromatic ring) differs quite considerably from that of aliphatic isocyanates.

Accordingly, one of the objects of the present invention is to provide a process which allows the one-step blocking of the isocyanate functions and aqueous emulsification of the product(s) obtained.

Another object of the present invention is to provide a process of the above type which uses little or no solvent.

Another object of the present invention is to provide a process of the above type which uses a relatively low proportion of surfactants, advantageously not more than about 20%, preferably not more than about 15%, more preferably not more than about 10%, even more preferably not more than about 8%, by mass relative to the mass of the isocyanate composition.

Another object of the present invention is to provide a composition which can be obtained by a process of the above type, the solvent content of this composition being less than $\frac{1}{5}$, advantageously less than $\frac{1}{10}$, by mass of the said composition.

Another object of the present invention is to provide an emulsion which can be obtained by a process of the above type, this emulsion having a water content (i.e. water plus non-grafted surfactants), expressed by mass, of not more than 60%, advantageously not more than 50%, preferably not more than 40%.

Another object of the present invention is to provide an emulsion of the above type which does not disrupt the subsequent operations prior to coating.

These objects and others which will become apparent later are achieved by means of a process which includes the step consisting in:

a) placing an isocyanate composition containing free isocyanate functions in contact with at least one blocking agent A in the presence of a surfactant B and an aqueous phase, the said isocyanate composition being added gradually to a stock containing at least some of the aqueous phase and at least some of the blocking agent.

Preferably, the process also, but not necessarily, includes the following steps:

b) subjecting the mixture obtained in a) to a shear (speed gradient) of greater than 1000 s$^{-1}$, preferably greater than 20,000 s$^{-1}$ and less than 1,000,000 s$^{-1}$ preferably less than 200,000 s$^{-1}$, and c) repeating step b), optionally after step a) has been repeated, until a stable emulsion is obtained whose particles have a Sauter diameter of greater than 0.1 µm, preferably 0.2 µm, and less than 5 µm, preferably less than 2 µm, and a dispersion width (W) of less than 5 µm.

The Sauter diameter is defined as being the size such that $\Sigma\ n_i d_i^3 / \Sigma\ n_i d_i^2$ of the particles are less than or equal to the said size, $n_i$ being the number of particles and $d_i$ being the corresponding diameter.

The dispersion width (W) is defined by:

$W = d_{90} - d_{10}$, $d_{90}$ and $d_{10}$ being, respectively, the sizes such that 90% and 10% of the particles are less than or equal to these sizes.

The surfactant can be added to the aqueous phase or to the polyisocyanate composition in accordance with the invention. However, it is preferred to add the surfactant to the polyisocyanate composition rather than to the aqueous phase, so as to avoid the formation of foam.

If, however, the surfactant is added to the aqueous phase, the surfactant will be selected so as to avoid or at least minimize the formation of foam.

The said surfactant is a pure agent or a mixture of agents.

Preferably, but not exclusively, a surfactant which forms a self-emulsifying mixture is used.

It is also preferred for the surfactant not to be chemically attached to the isocyanate, since the application properties of the final compositions are then better.

The polyisocyanate composition can contain various groups bearing isocyanate function(s) and its components will be defined in greater detail later.

Thus, in the course of the study which led to the present invention, it was shown, surprisingly, that it is possible, in a single operation:

to carry out the blocking reaction of the isocyanate functions on an isocyanate or a polyisocyanate, or on a mixture of isocyanates and/or polyisocyanates, with one or more protecting groups, in aqueous medium;

and to emulsify the composition formed during the process in the presence of a surfactant.

The order of the above operations has not been definitively established in all cases. However, at the end of this double operation, a blocked isocyanate emulsion with high physical stability, with a fine particle size and with a high solids content, advantageously greater than 50% by weight relative to the weight of the emulsion, is obtained.

The term physical stability is understood to mean that the emulsion shows no phase separation for at least two weeks, advantageously at least one month, preferably at least two months, at room temperature.

It is desirable for the emulsion obtained also to be chemically stable, which means that less than 10% of the blocked isocyanate functions show a chemical reaction towards water after a storage time of at least two weeks, advantageously at least one month, preferably at least two months, at room temperature.

Thus, the emulsification and blocking operations are carried out together and simultaneously. This is contrary to the teaching of European patent application No. 524,511, in which the addition of the isocyanate composition is sudden and in which the formation of the emulsion is not staged over a particularly long period.

In order to obtain good results, the isocyanate composition should be added so as to avoid having too large a proportion of true isocyanate functions in the reaction mixture. This limit varies with the other reaction parameters. In particular, in the isocyanate phase in recirculation, it is preferable for the content of true isocyanate functions to be equal to not more than 2 equivalents per kg (i.e. about 8% by mass of isocyanate function), advantageously not more than about 1 equivalent per kg (i.e. about 4% by mass), preferably not more than 0.8.

However, it can be pointed out that, irrespective of the conditions, it is preferable to control the introduction such that the ratio between the respective concentrations of free isocyanate in the isocyanate phase and of blocking agent, expressed as equivalents or as moles per liter of aqueous phase (excluding blocking agent), is less than 1, advantageously equal to not more than 0.5, preferably not more than 0.2.

This way of proceeding is particularly novel and unexpected in the knowledge of the reactivity of the isocyanate function with water.

When the process of the invention also includes a step b), the amount of isocyanate composition introduced into the aqueous phase per unit of time obviously depends on the capacities of the high-shear device and on the heat transfer.

In general, a low flow rate gives gradual emulsification and indirectly increases the recirculation number in the shear zone.

During phase c) of the process according to the invention, in particular during the recirculation regime, care will likewise be taken to ensure that the content of true isocyanate functions is not more than 5 to 6% by mass, preferably not more than 2% by mass, relative to the total of the isocyanate functions (free and blocked).

According to the process of the invention, it has been determined that the polyisocyanate blocking reaction takes place mainly in the shear device. Thus, it is estimated that at least about 90%, and more advantageously 95%, of the reaction proceeds under the effect of the high shear to which the mixture is subjected.

Surprisingly, it has been observed that the process can be carried out on an industrial scale without the reaction becoming runaway due to points of overheating, attributable to the high-shear device, combining with the exothermic nature of the reaction.

The process according to the invention also makes it possible to obtain emulsions of polyisocyanates blocked (or blocked) with protecting groups of different nature, by reacting, in the same way as described above, the polyisocyanates with a mixture of protecting agents.

The process makes it possible to make emulsions of mixtures of polyisocyanates of varied nature, whose isocyanate functions can be blocked with identical or different protecting groups.

Thus, the said composition having an isocyanate function can be a pure product or, more generally, a mixture of several constituents; the constituents of the said composition are, on the one hand, one or, more generally, a mixture of molecules bearing isocyanate functions, some of which can be blocked, and, on the other hand, optionally, adjuvants that are more or less inert under the operating conditions; these are usually solvents. In general, the molecules bearing isocyanate functions which may be partially blocked are oligomers of compounds considered as monomers to variable degrees of polymerization.

As a guide, when dealing with a mixture of molecules bearing isocyanate functions which may be partially blocked, the said composition containing free isocyanate functions contains on average more than one and up to five isocyanate functions (blocked or unblocked) per molecule bearing isocyanate function(s).

The said composition containing an isocyanate function preferably contains, on average, 4/3 to 4 isocyanate functions (blocked or unblocked) per molecule bearing isocyanate function(s).

However, in order to obtain good crosslinking agents, it is preferred to prepare compositions according to the present invention which statistically have more than 2 isocyanate functions (blocked or unblocked).

As has already been mentioned, these molecules bearing isocyanate functions, and which are often mainly oligomers (with a molecular weight of greater than 300, advantageously greater than 500, and less than 5000, advantageously less than 2000), can already be partially blocked overall and thus have some of their isocyanate functions blocked.

In general, the average number of free isocyanate functions per bearer molecule ranges from $10^{-2}$ to 20, more specifically from 0.1 to 3. However, there is an especial economic advantage for values greater than 1, advantageously at least equal to 2.

A few more details regarding the structure of the preferred constituents will be given hereinbelow in the present description. It is advantageous for these characteristics to be satisfied by molecules bearing blocked or unblocked isocyanate functions of at least $\frac{1}{3}$, advantageously $\frac{1}{2}$, preferably $\frac{2}{3}$ of the isocyanate functions.

It should be recalled that a blocking agent is an agent which reacts with the isocyanate functions at low temperature and releases them sufficiently at high temperature, such that the co-reagent (generally polyol or polyamine) can couple with the blocked isocyanate function.

Surprisingly, although the products thus obtained are labile, it is possible to favour the blocking reaction in the presence of an aqueous phase. This is particularly surprising for blocking agents whose release temperature is relatively low. Thus, it has been possible according to the present invention to carry out blocking for agents whose release temperature (octanol test on an isocyanate function borne by a methylene and in a non-neopentyl position [i.e. the carbon atom bearing the methylene is not tertiary]) is between about 80° C., advantageously 110° C., and about 200° C. The most advantageous blocking agents are those whose release temperature is between 80° C., advantageously 110° C., and 160° C.

The said blocking agent A, which can be a mixture of blocking agents, usually has at least one labile hydrogen, such that the blocking reaction can be written as:

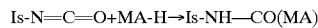

where MA-H represents the blocking agent;
where MA- represents the blocking group;
where Is represents the group bearing the isocyanate function considered.

The said blocking agent contains at least one function bearing a labile hydrogen, or more precisely a reactive hydrogen, for which function a pKa can be defined which corresponds either to the ionization of an acid [including the hydrogen of -ol functions (in the present description "-ol(s)" refers to phenols and alcohols], or to the acid combined with a base (generally a nitrogenous base). More precisely, in order to optimize the results of the present invention, the said pKa (or one of them if several can be defined) of the function with hydrogens is at least equal to 4, advantageously equal to 5, preferably equal to 6, and not more than 14, advantageously not more than 13, preferably not more than 12 and even more preferably not more than 10, one exception having to be made for lactams, whose pKa is higher than these values but which nevertheless constitute acceptable, although not preferred, blocking agents for the invention.

As non-limiting examples of the blocking agents according to the invention, mention may be made of hydroxylamine derivatives such as hydroxysuccinimide and oximes such as methylethylketoxime; hydrazine derivatives such as pyrazoles, triazole derivatives, phenol derivatives or the like, amide derivatives such as imides and lactams, as well as malonates or keto esters, and hydroxamates.

For the determination of the pKa values, reference may be made to "The determination of ionization constants, a laboratory manual, A. Albert of E. P. Serjeant; Chapman and Hall Ltd, London".

For the list of blocking agents, reference may be made to Z. Wicks (Prog. Org. Chem., 1975, 3, 73 and Prog. Org. Chem., 1989, 9,7) and Petersen (Justus Liebigs, Annalen der Chemie 562, 205, (1949).

The blocking agent(s) which is(are) useful in the protection reaction for the isocyanate function may or may not be water-soluble. This water-solubility facilitates the process according to the present invention, even though this solubility is only partial.

If they are soluble enough or low enough in viscosity to disperse easily in the aqueous phase, there is no difficulty here either; otherwise, it suffices to add a solvent in order to lower their viscosity. Thus, for liquid blocking agents, it will be possible to have a homogeneous or two-phase mixture depending on the water-solubility of the blocking agent.

As regards the solid products which are fully water-soluble at the reaction temperature of the reaction mixture, they can be used as they are.

As regards solid products which are only partially water-soluble at the reaction temperature, they can in general be used as they are or, where appropriate, the reaction medium can be made more stirrable by adding either a small amount of solvent to dissolve the protecting agent (which amounts to the above question of the liquid blocking agents), or an intermediary solvent (which is more or less inert under the operating conditions), or alternatively they can be used in molten form or in hot aqueous form.

The blocking agent can be introduced in a single portion into the base of the reactor with water and optionally the surfactant. It can also be introduced continuously into the reaction medium by co-injection with the polyisocyanate. In the latter case, it will be preferable to work with an amount of blocking (or blocking) agent in the reaction medium which is still sufficient to be able to mask the isocyanate function, optionally gradually as it is introduced when this introduction is gradual, and such that the content of true isocyanate functions in recirculation is not greater than the limits indicated above.

In all cases, efforts will be made to have a blocking agent A/isocyanate function(s) molar ratio (or more precisely a ratio as equivalents) which, taking into account the optional reagents (no account being taken of the water), has a value at least equal to a value close to the stoichiometry, generally between 0.8 and 2, advantageously between 0.9 and 1.2 S.A. (i.e. stoichiometric amount).

However, when the blocking agent can be used as a (co)solvent and when it is compatible with the emulsion, the upper limit of the ratio is considerably greater than 2 and the excess which has not reacted with the isocyanate functions can constitute up to ¼ of the mass of the final emulsion.

To promote the reaction selectivity, tertiary amines or any catalyst which promotes the reaction for blocking of the isocyanate function by the blocking agent more than the reaction of the hydroxyls of water with the isocyanate functions, can thus be introduced into the reaction medium.

The surfactant which is useful for forming the emulsion is chosen from standard surfactants known to those skilled in the art for their emulsion-forming properties.

The surfactant can either be foreign to the isocyanate or can itself be an isocyanate and result from the reaction of an isocyanate with a precursor containing a reactive hydrogen function (the said precursor either having significant hydrophilicity or itself already being amphiphilic), or can be a mixture of both. This synthesis can either have been carried out prior to the blocking or can be carried out simultaneously.

The surfactant(s) (B) used can be nonionic with an HLB of greater than 10, preferably from about 10 to about 20, anionic, cationic, zwitterionic or amphoteric, advantageously with an HLB of greater than about 10.

The nonionic surfactants can be chosen from alkoxylated fatty acids, polyalkoxylated alkylphenols, polyalkoxylated fatty alcohols, polyalkoxylated or polyglycerolated fatty amides, polyglycerolated alcohols and α-diols, ethylene oxide/propylene oxide block polymers, as well as alkylglucosides, alkylpolyglucosides, sucroethers, sucroesters, sucroglycerides, sorbitan esters and ethoxylated compounds of these sugar derivatives advantageously having an HLB of at least about 10.

The anionic surfactants can be chosen from alkylbenzene sulphonates, monoalkyl sulphates, alkyl ether sulphates, alkylaryl ether sulphates, dialkyl sulphosuccinates, alkyl phosphates, ether phosphates that are well dissociated, such as those constituting salts of alkali metals or of ammoniums, advantageously quaternary ammoniums, advantageously having an HLB of at least about 10. A number of preferred surfactants will be detailed below.

Among the cationic surfactants, mention may be made of aliphatic or aromatic fatty amines, aliphatic fatty amides and quaternary ammonium derivatives advantageously having an HLB of at least about 10.

Among the zwitterionic or amphoteric surfactants, mention may be made of betaines and derivatives thereof, sultaines and derivatives thereof, lecithins, imidazoline derivatives, glycinates and derivatives thereof, amidopropionates and fatty amine oxides advantageously having an HLB of at least about 10.

The (mixture of) surfactant(s) is chosen as a function of the nature of the oil and/or of the gum and/or of the resin containing a (poly)isocyanate group; advantageously, an HLB of about 11 to 15 is generally chosen to emulsify a (poly)isocyanate oil or gum; however, ionic surfactants with an HLB at least equal to about 20 (in the present description the term "about" is used to emphasize the fact that, when the figure(s) furthest to the right in a number are zeros, these zeros are positional zeros rather than significant figures, except, of course, unless otherwise stated) are also suitable.

In general, when these surfactants are nonionic surfactants, they have hydrophilic groups such as, for example, ethylene oxide groups, in a number, generally greater than about 10, which is sufficient to allow easy emulsification of the blocked or unblocked polyisocyanates. These surfactants also have a hydrophobic part which can be chosen from aromatic groups bearing aliphatic chains or simply from aliphatic chains with a carbon number of between 8 and 50. Other hydrophobic units such as silicone units or fluoro units can also be used for specific applications.

As non-limiting examples, mention may be made of the derivatives of polyoxyalkylene esters of fatty acids, of ethoxylated alkylphenols, of phosphate esters containing a polyalkyloxyalkylene glycol chain (such as poly-oxy- and/or -propoxy-ethylene glycol, for example), and tristyryl phenols containing a polyethylene oxide chain.

The said surfactant can also consist of a neutral surfactant (or a mixture of neutral surfactants) or a surfactant containing an anionic function. The latter surfactants are preferred.

Thus, advantageously, the said surfactant (or a mixture of surfactants) contains a compound containing an anionic function and a polyethylene glycol chain fragment of at least one, advantageously at least 5, preferably of at least 7, oxyalkylene units of formula:

—(CHR—CH$_2$—O)— with R=H or CH$_3$, advantageously oxyethylenes.

The said surfactant (or one of its constituents) is advantageously based on a compound which has an anionic function.

According to the present invention, the said surfactant compound can be used alone or as a mixture with one or more other surfactants. These other surfactants can be agents which also correspond to the above requirement of containing an anionic function and advantageously a polyethylene glycol chain fragment preferably of at least 5 oxyethylene and/or oxypropylene units.

These optional surfactants can also be chosen from other ionic compounds [in particular aryl and/or alkyl sulphate(s) or phosphate(s) (obviously, aryl in particular encompasses alkylaryls and alkyl in particular encompasses aralkyls), aryl or alkyl phosphonate, phosphinate or sulphonate, fatty acid salt and/or zwitterionic salt] and from nonionic compounds which may or may not be blocked at the end of the chain (however, the nonionic compounds containing alcohol functions on at least one of the chains appear to have a slightly unfavourable effect on the (self)emulsion, although they have a favourable effect on other aspects of the paint composition: taking all of this into account, it is preferable that the content of this type of compound should represent not more than one-third, advantageously not more than one-fifth, preferably not more than one-tenth, of the mass of the said anionic compounds according to the invention).

Advantageously, the said compound contains a hydrophilic part formed of the said anionic function, the said (optional) polyethylene glycol chain fragment, and a lipophilic part based on a hydrocarbon-based radical.

The said lipophilic part is generally chosen from alkyl groups [in the present description alk-yl is taken in its etymological sense as the hydrocarbon-based residue of an alkan-ol after ignoring the alcohol (or -ol) function]; and aryl groups. When the number of ethylene glycol functions is not more than 5, the simple alkyls are advantageously branched, advantageously C$_8$ to C$_{12}$, the aralkyls are C$_{12}$ to C$_{16}$, the alkylaryls are C$_{10}$ to C$_{14}$ and the simple aryls are C$_{10}$ to C$_{16}$. If not, the lipophilic part can vary widely, especially when the number of ethylene glycol units is greater than 10, and can thus constitute a hydrocarbon-based radical of at least 1, advantageously of at least 3, and containing not more than 25, advantageously not more than 20, carbon atoms.

Advantageously, the said compound corresponds to formula I below:

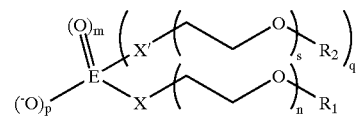

where q represents zero or 1;

where p represents an integer between 1 and 2 (closed intervals, i.e. including the limits);

where m represents zero or an integer between 1 and 2 (closed intervals, i.e. including the limits);

where X and X', which may be similar or different, represent an arm containing not more than two carbon-based chain members;

where s is zero or an integer chosen between 1 and 30, advantageously between 5 and 25, preferably between 9 and 20 (closed intervals, i.e. including the limits);

where n is zero or an integer chosen between 1 and 30, advantageously between 5 and 25, preferably between 9 and 20 (closed intervals, i.e. including the limits);

where E is an element chosen from carbon and the metalloid elements of atomic rank at least equal to that of phosphorus and belonging to column VB or to the chalcogens of atomic rank at least equal to that of sulphur;

where $R_1$ and $R_2$, which may be similar or different, represent a hydrocarbon-based radical advantageously chosen from optionally substituted aryls and alkyls.

Although this does not form part of the preferred compounds, it should be noted that s and/or n can be equal to zero, with the condition that E is phosphorus and that when s and n are equal to zero, $R_1$ and/or $R_2$, respectively, are $C_8$ to $C_{12}$ alkyls, which are advantageously branched, or $C_{12}$ to $C_{16}$ aralkyls or $C_{10}$ to $C_{14}$ alkylaryls.

One of the divalent radicals X and X' can also be a radical of the type ($[EO_m(O^-)_p]$) so as to form pyroacids such as the symmetrical or unsymmetrical diesters of pyrophosphoric acid.

The total carbon number of the anionic compounds towards which the present invention is directed is advantageously not more than about 100, preferably not more than about 50.

The divalent radicals X and optionally X' are advantageously chosen from divalent radicals consisting of (the left-hand part of the formula being linked to the first E):

⇒ when E is P, one of the groups X or X' can be O—P(O)(O$^-$)—X"—;

⇒ when E is P, one of the groups X or X' can be —O—($R_{10}$—O)P(O)—X"—; ($R_{10}$ being defined below) (X" representing an oxygen or a single bond);

→ a direct bond between E and the first ethylene of the said polyethylene glycol chain fragment;

→ a methylene which is optionally substituted and, in this case, advantageously partially functionalized;

→ the arms of structure —Y— and of structure -D-Y—, —Y-D-, —Y-D-Y' (where Y' represents the same values as Y)

where Y represents a chalcogen (advantageously chosen from the lightest, namely sulphur and especially oxygen), the metalloid elements of the atomic ranks at most equal to that of phosphorus and belonging to column VB, in the form of amine derivatives or tertiary phosphine derivatives (the radical ensuring the tertiary nature advantageously containing not more than 4 carbon atoms, preferably not more than 2 carbon atoms);

where D represents an optionally substituted alkylene, including a functionalized alkylene, D advantageously being ethylene or methylene, preferably ethylene in the structures -D-Y— and especially —Y-D-Y', and methylene in the structures —Y-D-.

Thus, E represents an atom chosen from carbon atoms (advantageously, in this case, m=1 and p=1, the prototype of this type of compound is a polyethoxylated alcohol acid [for example lactic acid or glycolic acid]), atoms which give pnictides (elements from column VB) (advantageously, in this case, m=1 or 0 and p=1 or 2), chalcogen atoms of a higher rank than oxygen (advantageously, in this case, m=1 or 2 and p=1 and q=0).

Thus, when E is a chalcogen atom, formula I advantageously simplifies to:

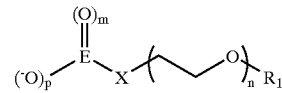

Advantageously, E represents carbon and especially phosphorus or sulphur, preferably phosphorus:
in the latter case, formula (I) becomes formula (II):

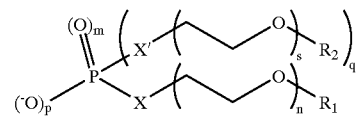

with, when q is zero.

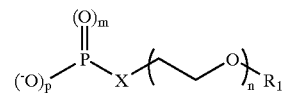

where p represents zero or an integer between 1 and 2 (closed intervals, i.e. including the limits);

where m represents zero or an integer between 1 and 2 (closed intervals, i.e. including the limits);

where the sum p+m+q is not more than three;

where the sum 1+p+2m+q is equal to three or five;

where X and X', which may be similar or different, represent an arm containing not more than two carbon-based chain members;

where n and s, which may be similar or different, represent an integer chosen between 5 and 30, advantageously between 5 and 25, preferably between 9 and 20 (closed intervals, i.e. including the limits);

where $R_1$ and $R_2$, which may be similar or different, represent a hydrocarbon-based radical advantageously chosen from aryls and alkyls optionally substituted in particular with a halogen atom, in particular fluorine.

The Periodic Table of the Elements used in the present application is the one in the supplement to the Bulletin de la Société Chimique de France, January 1966, No. 1.

The optional functionalization of the alkylenes, and in particular methylenes (X and X'), is carried out by hydrophilic functions (tertiary amines and other anionic functions, including those described above [$EO_m(O^-)_p$]).

The counter-cation is advantageously monovalent and is chosen from inorganic cations and organic cations that are advantageously non-nucleophilic and, consequently, of quaternary or tertiary nature (in particular oniums from column V, such as phosphonium, ammoniums, or even from column VI, such as sulphonium, etc.) and mixtures thereof, usually ammoniums, generally derived from an amine, advantageously a tertiary amine. Advantageously, an organic cation containing a hydrogen which is reactive with the isocyanate function is avoided. This results in a preference for tertiary amines.

The inorganic cations can be sequestered by phase-transfer agents such as crown ethers.

The pKa of the cations (organic [ammonium, etc.] or inorganic) is advantageously between 8 and 12.

The cations, and in particular the amines, corresponding to the ammoniums, advantageously have no surfactant property, but it is desirable that they should have good solubility, or in any case sufficient solubility to ensure that of the said compounds containing an anionic function and advantageously a polyethylene glycol chain fragment, in aqueous phase and at the working concentration. Tertiary amines containing not more than 12 carbon atoms, advantageously not more than 10 carbon atoms, preferably not more than 8 carbon atoms, per "onium" function (it is reminded that there is preferably only one of these per molecule) are preferred. The amines can contain other functions, and in particular functions corresponding to amino acid functions and cyclic ether functions such as N-methylmorpholine, or otherwise. These other functions are advantageously in a form which does not react with the isocyanate functions and does not significantly impair the solubility in aqueous phase.

It is very desirable for the anionic compounds according to the present invention to be in a neutralized form, such that the pH induced during a dissolution or a placing in contact with water is at least equal to 3, advantageously to 4, preferably to 5, and not more than 12, advantageously not more than 11, preferably not more than 10.

When E is phosphorus, it is desirable to use mixtures of monoester and of diester in a molar ratio of between 1/10 and 10, advantageously between 1/4 and 4. Such mixtures can also contain from 1% to about 20% (it is, however, preferable for this not to exceed about 10%) by mass of phosphoric acid (which will advantageously be at least partially salified so as to be within the recommended pH zones) and from 0 to 5% of pyrophosphoric acid esters.

The ratio—surfactant or mixture of surfactants/starting polyisocyanate(s)—is advantageously at least equal to 0.5%; preferably to at least 1%, more preferably to 5%. This ratio is advantageously ≦(not more than) about 20%, preferably not more than about 10%, more preferably not more than 10% (2 significant figures).

For good emulsion stability, it is preferred for the ratio to be between 3% and 8%, a particularly preferred ratio being between 4.5% and 5.5%.

The surfactant can also be generated in situ during the blocking reaction by reaction of a molecule containing a function which is reactive with the isocyanate function and having an ethylene oxide number which is sufficient for the final molecule to have emulsifying capacities.

In the latter case, it is necessary for the reactive function of the molecule to have a reactive hydrogen function corresponding to the same criteria as those defined above for the blocking agent functions.

In certain cases, it is possible to introduce a first surfactant which facilitates dispersion of the said composition before blocking according to the present invention, into the reaction medium and a second surfactant which stabilizes the polyisocyanate emulsion after the blocking reaction according to the present invention.

The isocyanates, in particular the aliphatic isocyanates, react with some of the anionic compounds targeted by the invention. They react with the hydroxyl of the non-neutralized or poorly-neutralized acid functions.

In particular, in the case of phosphates (m=1), they react to give compounds of the type:

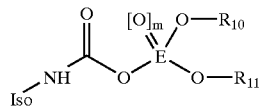

However, when E belongs to the phosphorus column and when m (which is the same as in formula I) is equal to zero, the compound is isomerized (or does so directly) to give:

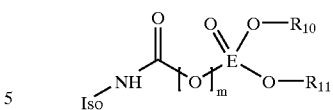

⇒ where E is an element from column Va of the Periodic Table of the Elements [(supplement to the Bulletin de la Société Chimique de France January 1966 No. 1), advantageously phosphorus], and thus, in particular, of the type:

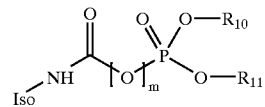

⇒ where Iso is the residue of a (poly)isocyanate (after removal of an isocyanate function),
⇒ where $R_{10}$ is a hydrocarbon-based residue (i.e. one containing hydrogen and carbon atoms) whose point of attachment [i.e. the atom bearing the open bond] is a carbon:
⇒ where $R_{11}$ is chosen from
→ a negative charge
→ a group of formula:

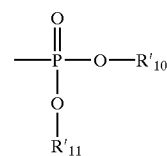

in which $R'_{10}$ is chosen from hydrocarbon-based residues (which may be similar to or different from $R_{10}$) and a negative charge whose point of attachment [i.e. the atom bearing the open bond] is a carbon,
in which the group(s) $R'_{11}$ is (are) chosen from hydrocarbon-based residues whose point of attachment [i.e. the atom bearing the open bond] is a carbon (which are similar to or different from $R_{10}$ and $R'_{11}$) and a negative charge.

It is desirable for at least one of the organic substituents (($R_{10}$; $R'_{11}$; $R'_{10}$) to contain a polyethylene glycol chain fragment advantageously of at least 5, preferably at least 7, ethylene oxide units. In other words, it is desirable for at least one of the organic substituents to correspond to the same formula as the substituents of E in the general formula I. More specifically, at least one of the organic substituents ($R_{10}$; $R'_{11}$; $R'_{10}$) corresponds to the formula:

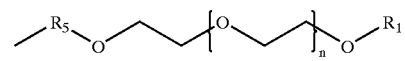

where $R_5$ represents an arm containing not more than two carbon-based chain members (with the same preferred values as X' and X);
where n is an integer chosen between 0 and 30, advantageously between 5 and 25, preferably between 9 and 20 (closed intervals, i.e. including the limits);
where $R_1$ represents a hydrocarbon-based radical advantageously chosen from optionally substituted aryls and alkyls.

Thus, according to an advantageous variant of the present invention, the compositions according to the present invention contain compounds derived from the reaction outlined above in an overall proportion, relative to a volume of one liter of isocyanate, of from 0.01 to 1, advantageously from 0.05 to 0.5, preferably from 0.05 to 0.3 function equivalent:

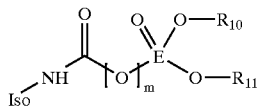

It is advantageous for the Iso radical to give, mainly or in total, an aliphatic bond with the same preferences as those outlined above for the isocyanates.

The compounds of formula

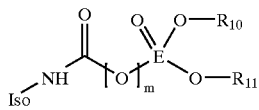

in which $R_{10}$ and $R_{11}$ can take the above values, but also, when m is 1, can be a negative charge on account of the fact that there may be significant amounts of residual phosphoric acid in certain batches, also form part of the invention.

Needless to say, $R_{10}$ can then also be equal to:

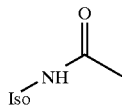

The Iso radical may or may not then be the same as that of the last but one formula, in which Iso represents a polyisocyanate residue, advantageously the residue of a product of reaction of a diisocyanate monomer to form biuret or isocyanurates (trimer) or with a di- or polyol, advantageously a triol or a tetra-ol.

It is advantageous for the Iso radical to give, mainly or in total, an aliphatic bond with the same preferences as those outlined above for the isocyanates.

The mass ratio between the isocyanates to be suspended and the surfactant compound containing an anionic function and a polyethylene glycol chain fragment is usually not more than ⅓, advantageously not more than about 20%, preferably not more than about 10% (in the present description the term "about" is used to emphasize the fact that when the figure(s) furthest to the right in a number are zeros, these zeros are positional zeros rather than significant figures, except, of course, if otherwise specified).

The mass ratio between the isocyanates to be suspended and the said compound containing an anionic function and a polyethylene glycol chain fragment is advantageously greater than 1%, preferably greater than 2%.

Thus, the mass ratio between the isocyanates to be suspended and the said compound containing an anionic function and a polyethylene glycol chain fragment is advantageously between 2% and 20%, preferably between 4 and 10%.

Advantageously, Iso bears, besides the function featured in the formula, at least one, preferably at least two, isocyanate functions of which, preferably, at least one is not blocked, and of which, more preferably, at least two are not blocked.

The use of the surfactants which have just been described for the emulsion blocking of isocyanates has never been described.

This novel use constitutes another subject of the invention.

The aqueous phase can contain various agents, in particular thickening polymers.

The aqueous phase can also contain a polyol or a mixture of polyols of polyacrylic or polyester nature in emulsion or solution form.

The implementation of the process will be detailed below.

It is desirable for the pH of the aqueous phase to be maintained at a value of not more than 12, advantageously not more than 11, preferably not more than 10, throughout the reaction.

It is desirable for the pH of the aqueous phase to be maintained at a value at least equal to the value (pKa-2), advantageously at least equal to the value (pKA-1), preferably at least equal to the pKa value of the blocking agent, or of one of the blocking agents, throughout the reaction.

When several blocking agents are used, it may be preferable to be at a pH as defined above corresponding to the highest pKa value. In this case, the blocking reaction takes place with all of the blocking agents of the mixture.

The pH can also be varied depending on whether it is desired for the reaction to take place simultaneously or, preferably, with the blocking agent having the lowest pKa.

The use of phosphates gives a buffer effect which promotes the reaction of the blocking agent with respect to the reaction of water. In addition, the use of buffer solutions, and most particularly phosphate solutions of surfactant nature, promotes the reaction of the isocyanate with the blocking agent rather than with the water.

According to a particularly advantageous implementation of the present invention, the reaction temperature is not more than 50° C., preferably not more than 40° C., and at least equal to about 0° C. (starting melting point of the aqueous phase) and preferably to about 20° C. Temperature gradients can also be adapted in order to optimize the process.

It is also desirable for the reaction to be carried out at a temperature of not more than the cloud point temperature of the surfactant (for the nonionic surfactants) or of the mixture of surfactants used, advantageously at a temperature at least 5° C. below, preferably at least 10° C. below, the cloud point.

When the said composition containing an isocyanate function is not fluid enough, it may be useful to add a solvent thereto; thus, the said composition containing an isocyanate function will then contain a solvent, including a mixture of solvents.

The blocking reaction is carried out with stirring.

In general, the stirring is carried out using a mixer device under conditions which ensure that 90%, by mass, advantageously 95% by mass, of the particles (droplets) are between 0.005 and 50 micrometers (between 0.005 and 50 μm) in size, advantageously between 0.05 micrometer and 20 micrometers in size, preferably between 0.1 and 10 micrometers in size.

It is important that the stirring used should be selected such that it gives a shear rate which is sufficient to keep the particle size small enough and to lead to a stable emulsion. Systems of the "ultra-turrax" type, for example, appear to be well suited to processes of this type. Other types of grinding mixers can also be used.

In the preferred variant of the invention, the unblocked or partially blocked isocyanate composition optionally containing the surfactant and/or a solvent is gradually introduced into the supply line of the high-shear device mentioned above, containing the aqueous phase in which is dissolved, emulsified and/or dispersed the blocking agent or the mixture of blocking agents, and optionally the surfactant if this is not added to the isocyanate composition.

In another variant of the process, the unblocked or partially blocked polyisocyanate composition is introduced into the supply line of the high-shear device containing a stock of blocked polyisocyanate emulsion containing the blocking agent.

The aqueous phase containing the blocking agent or mixture of blocking agents, and optionally the surfactant, is advantageously placed in circulation on a stirred tank having a homogenization and heat-transfer function.

The initial supply temperature is ambient temperature. The phase containing the (poly)isocyanate is added gradually to the aqueous phase at a constant flow rate upstream of the high-shear device.

The supply time for the dispersed phase depends on the concentration level of the emulsion.

Step b) is advantageously carried out in a mill, preferably of colloidal type.

The residence time in the mill, i.e. the shear time, is preferably at least 10 seconds, advantageously not more than 5 seconds.

The mill will be selected so as to ensure control of the shear within the range described, since a shear value which is too low does not produce fine particle sizes. Conversely, too high a value can break the emulsion or give rise to considerable local heating.

Raising the temperature of the medium beyond a certain temperature runs the risk of leading to inversion of the emulsion. This temperature (inversion temperature) depends on the surfactant. It is generally greater than 50° C.

Advantageously, step c) is carried out by recirculation of the aqueous phase in which the isocyanate composition in blocked form is emulsified.

Preferably, step c) is continued after the end of the addition of the isocyanate composition, until a stable emulsion having the particle size characteristics mentioned above is obtained.

Advantageously, the isocyanate composition is subjected, before step b), to a prior step (b1) of shear at a rate (speed gradient) of less than 20,000 $s^{-1}$, preferably less than 10,000 $s^{-1}$, in order to obtain a predispersion of the polyisocyanate particles after placing in contact with the blocking agent and before the high-shear step b).

It is, indeed, desirable to carry out the increase in surface area of the polyisocyanate particles in two steps in two different zones, in order to avoid too sudden an increase in the surface area of the particles by instantaneous formation of an emulsion of very fine particle size, which would result in instability of the emulsion.

A mixer of static type which is selected for its mixing and shear performance is advantageously used for this purpose.

Step c) is carried out by passing the emulsion obtained through several high-shear devices arranged in series, or, more advantageously, by recirculating the emulsion in a single high-shear device, this being with the aim of limiting the residence time of the emulsion in the high-shear device in order to avoid a large increase in temperature beyond the inversion temperature of the emulsion.

It is preferred that the residence time should be such that the temperature does not exceed 50° C., preferably 40° C.

At the end of step b), i.e. before passing the emulsion obtained after step b) into the next high-shear device, in the case where these are arranged in series, or into the same device in the case of a recirculation, the emulsion is preferably cooled using at least one heat-transfer means which can consist of one (a series of) static mixer(s) located downstream of the high-shear device.

This type of mixer will this time be selected for its heat-transfer performance.

Moreover, the temperature regulation is also ensured, where necessary, by the recirculation loop which also improves the mixing of products (aqueous phase, blocked polyisocyanate surfactant) of complex rheology.

According to an advantageous variant of the present invention, the said composition containing free isocyanate functions and preferably containing the surfactant is injected or poured directly into the reaction medium consisting of water and of the blocking agent.

In certain cases, the (poly)isocyanate may be diluted in a solvent so as to lower its viscosity and make it easier to inject into the reaction medium. The amount of solvent will depend on the intended application, but also on the ability of the solvent to dissolve the said composition containing free isocyanate functions (before, during or after the reaction). The amount of solvent used which is residual in the final emulsion will generally be not more than ($\leqq$) 50% of the total mass of the emulsion, preferably less than 10% by mass relative to the total amount of the emulsion.

Another way of proceeding which is also advantageous consists in mixing the surfactant with the said composition containing free isocyanate functions and in injecting the mixture into the reaction medium consisting of water and of the blocking agent; however, care will be taken to avoid the formation of foam during the high-shear operation.

Another way of proceeding consists in co-injecting the said composition containing free isocyanate functions, alone or as a solution and/or as a mixture with the surfactant, with the blocking agent into a stock of water.

The solvents selected for the application are chosen from the class of esters, aromatic solvents, ethers and ketones, although this list is not limiting.

The boiling point of the solvents used will depend on the intended application and will be between 20° C. and 300° C., preferably between 50° C. and 225° C.

In certain cases, a solvent with a low boiling point may be used in a larger amount than those indicated above to dissolve the polyisocyanate, but, in this case, some of this solvent will be removed either by standard distillation or by distillation under partial vacuum, or by another process known to those skilled in the art.

To facilitate the injection of the isocyanate or of the polyisocyanate into the reaction medium, the polyisocyanate or the mixture as defined above can be preheated.

Parallel injections of isocyanates or of its solution and of blocking agents can be carried out. The flow rates of each of the partners will thus be adjusted such that the molar amount, in the reaction medium, of the blocking agent is preferably always slightly higher than the molar amount of isocyanate function to be blocked.

The process according to the invention is of batch/semi-batch type, or of continuous type (continuous introduction of polyisocyanate into the aqueous phase, continuous removal of aqueous blocked polyisocyanate emulsion).

The concentration of blocked isocyanate or polyisocyanate in the final emulsion, after optional dilution, is between 10 and 90%, preferably between 40 and 80% and advantageously between 55 and 75% (weight/weight).

The present invention makes it possible to obtain concentrations of blocked isocyanate function relative to the very large mass of water in the emulsion. Thus, the present invention makes it possible to prepare emulsions which, relative to the mass of water used, have a high level of functionality. Values of more than 3 isocyanate (in particular aliphatic isocyanate) equivalents per kg of water used, or even 4 equivalents, are easily obtained. The examples demonstrate that values at least equal to 5 can commonly be obtained.

Any isocyanate or polyisocyanate can be converted according to the process of the present invention, but the preferred polyisocyanates targeted by the invention are especially those which mainly contain molecules in which at least one, advantageously two, preferably three of the conditions below are satisfied:

at least one, advantageously two, of the NCO functions to be protected are connected to a hydrocarbon-based skeleton via a saturated carbon ($sp^3$).

at least one, advantageously two, of the said saturated carbons ($sp^3$) bears at least one, advantageously two, hydrogen(s), (in other words, it has been found that better results are obtained when the carbon bearing the isocyanate function bears a hydrogen, preferably two hydrogens);

all of the carbons via which the isocyanate functions are connected to the hydrocarbon-based skeleton are saturated carbons ($sp^3$), some, preferably all, of which advantageously bear a hydrogen, preferably two hydrogens;

those which have, at least in part, an isocyanuric or biuret skeleton (whether this skeleton is derived from one or more monomers, see below) are particularly suitable.

When the polyisocyanates are relatively heavy, i.e. when they contain at least 4 blocked isocyanate functions, the first two conditions become:

at least one-third, advantageously two-thirds, of the NCO functions to be protected are connected to a hydrocarbon-based skeleton via a saturated carbon ($sp^3$);

at least one third, advantageously two-thirds, of the said saturated carbons ($sp^3$) bear at least one, advantageously two, hydrogen(s), (in other words, it has been found that better results are obtained when the carbon bearing the isocyanate function bears a hydrogen, preferably two hydrogens).

The molecules bearing blocked or unblocked isocyanate functions are derived, by condensation or oligomerization, from simpler molecules which generally consist of a hydrocarbon-based skeleton, usually purely hydrocarbon-based, and several isocyanate functions, in general two. These compounds are often referred to by the name monomer. They are rarely used unmodified.

In general, a precondensation is carried out under the action of a compound containing at least one function containing labile hydrogen (for example water in the case of biuret, polyols or polyamines), or a prepolymerization is carried out (for example dimerization or oligomerization as in the case of the formation of isocyanuric rings).

These skeletons can be obtained both from condensation with a single type of monomer (in general diisocyanate) and from several types of monomer. It is preferable for there to be at least one monomer, at least one of whose isocyanate functions is aliphatic [$sp^3$ hybridization of the carbon bearing the isocyanate function and advantageously bearing at least one, preferably two, hydrogen(s)]. It is especially preferable to block aliphatic functions by the techniques of the invention, it being possible for the other isocyanate functions to be blocked by techniques that are already well known per se.

One sub-family is directed towards the isocyanates obtained from a prepolymerization with polyols, in general triols, or polyamines, in general triamines, with a polyisocyanate, in general diisocyanate, the amount of isocyanate function being greater than that of the functions containing labile hydrogen (such as amines and/or alcohols), such that at the end of the prepolymerization the number of residual isocyanate functions per molecule is, on average, greater than 2, advantageously at least equal to 2.5; preferably at least equal to 3.

In accordance with an advantageous mode of the invention, the polyisocyanates whose NCOs are intended to be protected by blocking radicals are chosen from the products of homo- or heterocondensation of alkylene diisocyanate, in particular including products of the "biuret" type and of the "trimer", or even "prepolymer", type containing isocyanate functions including in particular urea, urethane, allophanate and ester amide functions, and from mixtures containing them.

These can be, for example, polyisocyanates sold by the Applicant Company under the name "Tolonate".

In general, the preferred polyisocyanates are the products of homo- or heterocondensation of the following isocyanate monomers:

1,6-hexamethylene diisocyanate,
1,12-dodecane diisocyanate,
1,3-cyclobutane diisocyanate,
1,3-and/or 1,4-cyclohexane diisocyanate,
1-isocyanato-3,3,5-trimethyl-5-diisocyanatomethylcyclohexane (isophorone diisocyanate), IPDI),
2,4-and/or 2,6-hexahydrotoluylene diisocyanate,
1,3-and/or 1,4-hexahydrophenylene diisocyanate,
2,4'-and/or 4,4'-perhydrodiphenylmethane diisocyanate,
1,3-and/or 1,4-phenylene diisocyanate,
2,4-and/or 2,6-toluylene diisocyanate,
2,4'-and/or 4,4'-diphenylmethane diisocyanate,
4-isocyanatomethyloctylene diisocyanate (LTI or NTI),
4,4',4"-triphenylmethane triisocyanate,
1,3-bisisocyanatomethylcyclohexane,
bisisocyanatomethylnorbornane (NBDI),
2-methylpentamethylene diisocyanate.

According to a possible, and sometimes advantageous, use of the present invention, if it is desired to obtain emulsions containing other component(s) directly, in particular those of coating formulations such as those for paint(s) and varnishes, they can be introduced, provided that they do not interfere with the reaction (and vice versa), into the aqueous phase (for example into the feed stock), into the emulsion and/or into the organic phase, before or during the reaction.

This is particularly advantageous in the case of polyols which, since they have no pKa within the above ranges (relating to the pKa of the blocking agent, see detail below), can then be introduced either at the start or during the reaction, or, of course, at the end. To do this, it is preferable for the pKa of the -ol functions of the polyol(s) to have a value which is not more than that of the blocking agent (or, when there is more than one blocking agent, the highest pKa of the blocking agents) which is increased by 2, advantageously 3, preferably 4 units. The composition can also contain an advantageously latent catalyst (releasable by the action of external agents, for example visible or UV radiation, oxygen).

The subject of the invention is also a plant for carrying out the process according to the invention, the said plant comprising at least:

a shear means, preferably a mill, advantageously a colloidal mill which can generate a shear rate (speed gradient) of greater than 1000 s$^{-1}$, preferably greater than 20,000 s$^{-1}$, and less than 1,000,000 s$^{-1}$, preferably less than 200,000 s$^{-1}$; and means for injecting an isocyanate composition into an aqueous phase.

Advantageously, the plant also comprises one or more of the following means:

means for recirculating the aqueous phase in the form of a blocked (poly)isocyanate emulsion;

means for regulating the injection flow rate of the isocyanate composition into the aqueous phase;

means for homogenizing the emulsion;

means for cooling the system; and means for removing the aqueous blocked polyisocyanate emulsion.

The scheme of a plant of this type and of the process according to the invention is represented in the attached FIG. 1.

The mill 1 is preferably a colloidal mill. This device is advantageously in the form of a set of conical jaws and comprises a rotor and a stator separated by a very small air gap. It preferably has interlocking teeth to increase the shear rate.

The geometry of the cones, the air gap and the mill rotation speed are selected as a function of the desired shear rate range and thus the desired particle size.

The means for injecting a polyisocyanate composition advantageously comprise a premixing vat 2 in which the polyisocyanate is mixed with the surfactant, where appropriate and optionally, with one or more solvents. The premixing vat is preferably connected to a nitrogen source 3.

They also comprise an inlet pipe 4 for the polyisocyanate composition in contact with the blocking agent in the aqueous phase, here towards the recirculation loop 5, and a pump 6 intended to regulate the injection flow rate of the polyisocyanate composition into the recirculation loop.

The recirculation means comprise a recirculation loop 5 fed with water to which is added at least some of the blocking agent and, where appropriate, of the surfactant by means of a stirred tank (or vat) 7. This in turn is fed by a tank 8 for storing the blocking agent and is optionally connected to a surfactant supply source (not represented). The tank 8 containing the blocking agent is placed under a nitrogen atmosphere by means of a nitrogen source 9.

The tank 7 advantageously comprises stirring means provided on two stages, the lower stage comprising an inclined four-blade turbomixer 10 and the upper stage comprising a Mixel TT 11 type turbomixer.

This specific arrangement is suited to the variable rheology of the medium (medium which is initially newtonian, and then non-newtonian for the final emulsion).

The stirring means 10 and 11 produce moderate stirring so as to homogenize the aqueous phase at the start of the process and of the aqueous blocked (poly)isocyanate emulsion when the process has reached a permanent regime. The tank 7 is connected to a nitrogen source 12. Advantageously, the tank 7 also comprises a jacket 13 intended to provide heat exchange.

The recirculation loop 5 also comprises, downstream of the mill 1, advantageously, a static mixer 15 whose function is essentially one of heat exchange.

The supply flow rate of the mill is regulated by means of a pump 16 placed at the outlet of the stirred vat 6.

The purpose of the pump 16 is to regulate the flow rate passing through the colloidal mill 1. The pumping effect of the colloidal mill 1 remains lower than that of a pump. Consequently, very large flow rate variations may exist between the initial solution, which has approximately the viscosity of water, and the final emulsion whose rheology depends on the level of concentration of solid materials and on the particle size. The function of the pump 16 is to overcome these large differences, which would otherwise result in large differences in the recirculation frequency, and thus the shear of the product.

The purpose of the static mixer 15 installed downstream of the colloidal mill 1 is to overcome the development of overheating points in the recirculation loop.

In accordance with the invention, at the start of the process, the water contained in the tank 7, to which some of the blocking agent contained in the storage reservoir and optionally some of the surfactant 7 are added, is circulated in the recirculation loop 5.

The polyisocyanate composition to which the surfactant and the solvent are added is then injected into the recirculation loop 5 by means of the pipe 4 and the pump 6.

The blocking and emulsification reactions start immediately after the placing in contact. The emulsion obtained is cooled in the series of static mixers 15 and then returns to the stirred tank 7, in which it is homogenized under the action of the stirring means 10 and 11 and cooled by the effect of a jacket 13.

The emulsion is again circulated in the recirculation loop 5, in which it is gradually enriched with blocked polyisocyanate under the shear action of the colloidal mill 1, the effect of which is also that the droplets constituting the emulsion become reduced in size and in dispersion index, until the final emulsion is obtained, which is then removed form the plant in a batchwise or continuous manner.

The subject of the invention is also a composition containing a blocked polyisocyanate emulsion, characterized in that it can be obtained by carrying out the process according to the invention and in that it contains not more than 60%, advantageously not more than 50%, by mass of water.

The composition according to the invention is also characterized by a final emulsion viscosity of less than 5500 mPa.s at at least 68% solids, at 25° C., and advantageously less than 1000 mPa.s at at least 60% solids, at 25° C.

The composition according to the present invention can contain various additives which are useful for paints; as has been mentioned above, these additives can be introduced into the reaction mixture, but are usually introduced after the blocking operation.

The isocyanate composition according to the invention can contain, after dispersing or emulsifying in an aqueous phase, a water content of 10 to 90%, and is generally of oil-in-water type, which is advantageous.

The aqueous phase of the emulsion generally serves as a vector for the co-reagents which can be polycondensed with the isocyanate functions and, in this case, contains compounds having functions containing reactive hydrogens, generally one or more polyols, which can be added to the aqueous phase before the simultaneous emulsification and blocking reaction, or added at a later stage.

This polyol is a polymer which contains at least 2 hydroxyl groups (phenol or alcohol), advantageously having a hydroxyl index of between 0.5 and 5%, advantageously between 1 and 3% (by mass).

The polymer skeleton can be of diverse chemical nature, in particular acrylic, polyester, alkyd or polyurethane.

It can contain carboxylic or sulphonic groups or no ionic groups.

The polyol may already be in aqueous or water-soluble or water-dispersible medium.

It can be an aqueous solution (which can be obtained in particular after neutralizing the ionic groups) or an emulsion of the polymer in water or a latex-type dispersion.

The polyol is advantageously a latex of nanometric size having the following characteristics:

$d_{50}$ of between 15 and 60 nm, advantageously between 20 and 40 nm, carboxylate function of 0.5 to 5% by mass
-ol function: between 1 and 4%, advantageously between 2 and 3%
solids content: between 25 and 40%
a $d_{80}$ of less than 1 micrometer.

The molar ratio between the free isocyanate functions and the hydroxyl functions is between 0.5 and 2.5, advantageously between 0.8 and 1.6, advantageously between 1 and 1.4.

The mass ratio between the isocyanates to be suspended and the said compound containing an anionic function and a polyethylene glycol chain fragment is usually not more than 1/3, advantageously not more than about 20%, preferably not more than about 10% (in the present description the term "about" is used to emphasize the fact that when the figure(s) furthest to the right in a number are zeros, these zeros are positional zeros rather than significant figures, unless, of course, otherwise specified).

The mass ratio between the isocyanates to be suspended and the said compound containing an anionic function and a polyethylene glycol chain fragment is advantageously greater than 1%, preferably greater than 2%.

Thus, the mass ratio between the isocyanates to be suspended and the said compound containing an anionic function and a polyethylene glycol chain fragment is advantageously between 2% and 20%, preferably between 4 and 10%.

According to a particularly advantageous implementation of the present invention, after dispersing or emulsifying, the sum of the mass contents of the isocyanate(s), of the emulsifier(s) and of the polyol(s) in the water ranges from 30 to 70%.

These polyols can also constitute surfactants.

Octanol Test

| | definitions |
|---|---|
| "release" (or "deblocking") temperature | this is the lowest temperature at which the blocking agent on the blocked isocyanate is displaced to a level of 9/10 (mathematical rounding) by a primary monoalcohol (the primary alcohol is generally octanol). |
| Shelf life | In order to ensure a good shelf life, it is preferable to select blocked isocyanate functions whose octanol test shows a "release" at 80° C., advantageously at 90° C., of not more than 90%. |
| Reaction progress | The reaction is considered complete if it proceeds to more than 90% of completion. |

Procedure

About 5 mmol of protected blocked NCO equivalent to be evaluated are loaded into a Schott type tube, with magnetic stirring.

2.5 to 3 ml of 1,2-dichlorobenzene (solvent) and the equivalent of 1-octanol (5 mmol, i.e. 0.61 g and optionally with the catalyst to be tested with the blocking group) are added.

The reaction medium is then brought to the test temperature. It is then heated for 6 h at the test temperature, so as to deblock the isocyanate functions and thus make them reactive. When the reaction is complete, the solvent is removed by distillation under vacuum, and the residue is analysed by NMR, mass and infrared.

From these data, the percentage of blocked isocyanate function coupled with 1-octanol is evaluated.

The composition according to the invention can also comprise a catalyst for releasing the blocking group, which is advantageously a latent catalyst and which will be activated only during the polycondensation reaction of the blocked (poly)isocyanate with compounds containing functions containing reactive hydrogen, in particular under the effect of the polycondensation temperature.

The subject of the invention is also a process for using the compositions described above, this process containing the following steps:

application of a composition according to the invention in the form of a layer between 20 μm and 200 μm in thickness, and heating to a temperature at least equal to 80° C.

Lastly, the subject of the invention is a coating obtained by the process defined above.

The examples below illustrate the process according to the invention.

The experiments described in Examples 1 to 7 below were carried out in a reactor equipped with a mixer and a recirculation loop comprising an ultra-turrax machine rotating at a speed either of 8000 rpm or of 13,500 rpm. Some reagents are introduced into the reactor at the start of the experiment and others are introduced gradually during the experiment. This will be clearly specified for each of the examples. The device assembly is thermostatically regulated to a temperature specified in each of the examples.

Except where otherwise specified, the addition is carried out at constant flow rate over a period of one and a half hours. The deblocking kinetics are 1st order and, in the case of MEKO in the first half of the addition, can be estimated that 10 to 20% of the isocyanate initially present have reacted in one minute. It can thus be estimated that the amount of free isocyanate is not more than the amount introduced over ten minutes.

Half an hour after the end of the reaction, the reaction is considered to be complete.

The surfactant Rhodafac® RE610 (the main components of which correspond to formula I) is a phosphatized ethoxylated alkylphenol and Antarox® 461P is an ethoxylated propoxylated alkylphenol.

EXAMPLE 1

153.05 g of product referred to by the acronym "MEKO" (methylethylketoxime or, more precisely, 2-butoxime) and 216.5 g of water are poured into the reactor which is thermostatically adjusted to 25° C. Separately, 324 g of HDT and 16.2 g of butyl acetate (BuOAc) and 13 g of Rhodafac RE610® and 3.7 g of triethylamine (Et$_3$N) are premixed. This mixture is gradually added to the reactor (flow rate 3.34 g/min≅0.017 mol NCO/min). The Ultraturrax® speed is 8000 rpm. After 1 hour 37 minutes of addition, the mixture is ground for a further hour.

The blocked polyisocyanate emulsion thus obtained is a direct emulsion characterized by an average particle size of 1.56 μm. It contains no residual urea and contains a 1.55% excess of blocking agent.

EXAMPLE 2

153.05 g of product referred to by the acronym "MEKO" (methylethylketoxime or, more precisely, 2-butoxime) and 216.5 g of water are poured into the reactor which is thermostatically adjusted to 25° C. Separately, 324 g of HDT and 16.2 g of butyl acetate (BuOAc) and 13 g of Rhodafac RE610® and 3.7 g of triethylamine (Et$_3$N) and 1.3 g of sodium dodecyl sulphate (SDS) are premixed. This mixture is gradually added to the reactor (1 hour 30 min). The Ultraturrax® speed is 8000 rpm.

The emulsion obtained is a direct emulsion characterized by an average particle size of 1.62 μm. It contains no residual urea and contains a 1.38% excess of blocking agent.

EXAMPLE 3

153.05 g of product referred to by the acronym "MEKO" (methylethylketoxime or, more precisely, 2-butoxime) and 216.5 g of water, as well as 6.5 g of Rhodafac RE610® and 1.85 g of TEA, are poured into the reactor which is thermostatically adjusted to 45° C. Separately, 324 g of HDT and 16.2 g of butyl acetate (BuOAc) and 6.5 g of Rhodafac RE610® and 1.85 g of triethylamine (Et$_3$N) are premixed. This mixture is gradually added to the reactor (52 min). The Ultraturrax® speed is 8000 rpm.

The emulsion obtained is a direct emulsion characterized by an average particle size of 3 μm, containing drops of water/oil/water multiple emulsion. It contains no residual urea and contains a 1.2% excess of blocking agent.

EXAMPLE 4

153.05 g of product referred to by the acronym "MEKO" (methylethylketoxime or, more precisely, 2-butoxime) and 216.5 g of water are poured into the reactor which is thermostatically adjusted to 25° C. Separately, 324 g of HDT and 16.2 g of butyl acetate (BuOAc) and 16.2 g of Rhodafac RE610® and 5.7 g of triethylamine (Et$_3$N) are premixed. This mixture is gradually added to the reactor. The Ultraturrax® speed is 8000 rpm.

The emulsion obtained is a direct emulsion characterized by strong polydispersity around two average values of 1.56 μm and 15 μm. In addition, this emulsion contains drops of water/oil/water multiple emulsion. It contains a small amount of urea.

EXAMPLE 5

153.05 g of MEKO and 216.5 g of water are poured into the reactor, which is thermostatically adjusted to 25° C. Separately, 324.3 g of HDT and 16.2 g of Rhodafac RE610® and 5.7 g of triethylamine (Et$_3$N) are premixed. This mixture is added gradually to the reactor (1 hour 35 min). The Ultraturrax® speed is 13,500 rpm.

The emulsion obtained is a direct emulsion characterized by an average particle size of 1.5 μm containing a small population of particles larger than 10 μm in diameter. It contains no residual urea and contains a 1.43% excess of blocking agent.

EXAMPLE 6

153.05 g of MEKO and 216.5 g of water and 13 g of Rhodafac RE610® and 3.7 g of triethylamine (Et$_3$N) are poured into the reactor, which is thermostatically adjusted to 45° C. Separately, 324 g of HDT and 16.2 g of butyl acetate (BuOAc) are premixed. This mixture is added gradually to the reactor (1 hour 10 min). The Ultraturrax® speed is 13,500 rpm.

The emulsion obtained is a direct emulsion characterized by an average particle size of 2.5 μm with a population having a diameter larger than 10 μm. It contains no residual urea and contains a 0.95% excess of blocking agent.

EXAMPLE 7

A mixture A of the following composition is prepared: 13 g of Rhodafac RE610®, 3.7 g of Et$_3$N, 153.05 g of MEKO and 216.5 g of water.

120 g of mixture A are poured into the reactor, which is thermostatically adjusted to 25° C. Separately, 324 g of HDT and 16.2 g of butyl acetate (BuOAc) are premixed. This mixture is added gradually to the reactor. Simultaneously, 266.25 g of mixture A are added gradually to the reactor (1 hour 50 min). The Ultraturrax® speed is 8000 rpm.

The emulsion obtained is a direct emulsion characterized by an average particle size of 1.41 μm. It contains no residual urea and contains a 2.19% excess of blocking agent.

The following results were obtained on a pilot plant.

EXAMPLE 8

1. Description of the Plant:

The pilot plant consists of a stirred 100 l tank with a GRC bottom and with a recirculation loop, as illustrated in the attached FIG. 1. The tank is placed under an inert atmosphere of nitrogen. The loop comprises, in the direction of passage of the fluid, a booster pump 6, the point for injecting the phase to be dispersed, a colloidal mill 1 and a series of static mixers for the heat transfer 15. The recirculation loop suction is central at the bottom of the tank. Its delivery is located on the dome. Another tank 2, also placed under inert atmosphere, contains the phase to be dispersed. The pilot is provided with instruments for measuring the temperature, pressure, flow rates and pressure/temperature alarms.

2. Reagents:

The polyisocyanate phase consists of HDT, solvent (5% by weight of butyl acetate relative to the HDT) and surfactant Rhodafac® RE610, polyoxyethylene nonylphenyl ether phosphate, neutralized with triethylamine).

The continuous phase consists of demineralized water and the blocking agent (MEKO). The MEKO is at most at a 0.6% excess by weight. It is partially water-soluble. The initial solution is supersaturated. The initial viscosity is close to that of water. It gradually increases during the process when the emulsion is concentrated. The final rheology depends on the level of concentration and on the particle size distribution of the emulsion.

3. Operating Conditions:

The process begins with an emulsion stock in order to avoid having too high a proportion of true isocyanate functions in the reaction medium.

The recirculation flow rate can vary between 400 and 1500 kg/h.

The supply flow rate of the phase to be dispersed is between 10 and 60 kg/h. The supply flow rate of the dispersed phase depends on the level of concentration of the emulsion. The total mass of the batch is 80 kg. The final concentration of blocked polyisocyanates is about 65% by weight. The supply temperature of the phase to be dispersed is about 20° C. (ambient temperature). The temperature of the medium ranges between 15–20° C. and 40° C. maximum. Its air gap increases from 50 to 200 μm. The vacuum pressure of the mill is maintained at above 0.2 bar (2×10$^4$ Pa). The counter-pressure is set by the pressure drops in the first tests.

The tests carried out are detailed in Table 1 below.

TABLE 1

Pilot tests carried out.

| Tests | 1 | 2 | 3 |
|---|---|---|---|
| Premix | HDT + 5% | HDT + 5% | HDT + 5% |
| Phase to be dispersed | BuOAc* + 5% SA | BuOAc* + 5% SA | BuOAc* |
| Emulsion tank | Demineralized | Demineralized water | Demineralized water + |
| Initial solution | water + MEKO | + MEKO | MEKO + 5% SA |
| Duration of stirring after end of supply (min) | 80 | 75 | 75 |
| excess of MEKO (%)*** | 0.6 | 0.6 | 0 |
| Mill air gap/speed ($\mu$m/rpm) | 80–90 3000 | 80–90 3000 | 80–90 3000 |
| Recirculation flow rate min/max (kg/h) | 400/1500 | 400/1500 | 400/1100 |
| Premix supply flow rate (kg/h) | 30 | 30 | 30 |
| Premix supply temperature (° C.) | 20 | 20 | 20 |
| Initial/final emulsion tank temperature (° C.) | 17–35 | 19–37 | 18–36 |

Key:
*BuOAc: n-butyl acetate
SA: Rhodafac ® RE610 surfactant neutralized with triethylamine (RE60/REA: 77.8%/22.2%)
***% by mass relative to the total mass of the emulsion.

The plant is cleaned with water for the emulsion tank and recirculation loop part, and with solvent (acetone, butyl acetate) for the supply line and premix tank part. After each test, the pilot is inspected in order to evaluate the efficiency of the cleaning.

4. Results:

The particle size and chemical analysis results for the various tests are summarized in Tables 3 and 4, respectively.

TABLE 2

Particle size results

| Test | 1 | 2* | 3 |
|---|---|---|---|
| Sauter diameter $d_{32}$ ($\mu$m) | 0.84 | 0.53 | 1.78 |
| Diameter at 90% of the population ($\mu$m) | 1.87 | 1.27 | 13.33 |
| Diameter at 10% of the population ($\mu$m) | 0.48 | 0.28 | 0.80 |
| Dispersion width: $d_{90} - d_{10}$ ($\mu$m) | 1.39 | 0.99 | 12.53 |

*surfactants: Antarox ® 461P + 2% SDS, 10% Solvesso/RPDE ® solvent

TABLE 3

Chemical analyses

| Analyses | 1 | 2 | 3 |
|---|---|---|---|
| Residual MEKO (% by mass in emulsion) | 2.2 | 1.7 | 0.87 |
| Residual NCO (%) | 0 | 0 | 0 |
| MEKO-blocked heavy fractions (%) | 50.3 | 49.0 | 50.6 |
| MEKO-blocked trimer (%) | 49.4 | 50.2 | 48.7 |
| MEKO-blocked monomers (%) | 0.1 | 0.5 | 0.5 |
| Trimer*** blockage C═O/C═O ratio*** (%) | 0.79 | 0.787 | 0.793 |

***ratio of the absorbance of the bands for Tolonate ® D2:0.851.

After supplying the phase to be dispersed, a period of additional stirring results in refining of the emulsion. The distribution width of the emulsion is also reduced during this step. The corresponding particle size variations are represented in FIG. 2.

The diameter $d_{10}$ (diameter at 10% of the population) reduces very slightly during the refining (it is set by the maximum shear of the system). On the other hand, the diameter $d_{90}$ (diameter at 90% of the population) shows large variations. It is responsible for the reduction of the dispersion width and the Sauter diameter $d_{32}$. Recirculation of the emulsion in the shear zone ensures fractionation of the coarse droplets. This phenomenon thus brings about homogenization of the particle size distribution. After a duration of about 65 to 70 minutes, the particle size no longer changes. These variations tend towards increasing the stability of the emulsion (reduced dispersion width).

The final emulsion has a residual MEKO content which is higher than the initial excess. Urea thus forms to a very slight extent in the medium. The residual MEKO content decreases during the post-supply stirring period. The blocking reaction ends during the refining period of the emulsion.

The increase in the concentration level ensures an increase in the shear constraints. Moreover, the use of an ejector to supply the phase to be dispersed improves the quality of mixing at the point of injection. Better contact between the two fluids (phase to be dispersed and aqueous phase) moreover increases the kinetics (reaction initiated at the interface and diffusional resistance). These two modifications bring about a large reduction in particle size (Sauter diameter and dispersion width: $d_{32}=0.53$ µm, $d_{90}-D_{10}=0.99$ µm Test 2). The working values of the corresponding product show a marked increase, in particular of the gloss.

What is claimed is:

1. A process for preparing an oil-in-water emulsion of blocked (poly)isocyanates, the process comprising:
   conducting a one-step emulsifying-and-blocking reaction by placing an isocyanate composition comprising free isocyanate functions in contact with at least one blocking agent A in the presence of a surfactant B and an aqueous phase, the isocyanate composition being added gradually to a stock containing at least some of the aqueous phase and at least some of the blocking agent so that the content of free isocyanate functions is equal to not more than 2 equivalents per kg in the isocyanate phase.

2. The process according to claim 1, wherein the composition containing an isocyanate function contains, on average, 1 to 5 isocyanate functions per molecule bearing isocyanate function(s).

3. The process according to claim 1, wherein the composition containing an isocyanate function contains, on average 4/3 to 4 isocyanate functions per molecule bearing isocyanate function(s).

4. The process according to claim 1, wherein the blocking agent contains at least one labile hydrogen.

5. The process according to claim 1, wherein the blocking agent contains at least one labile hydrogen and wherein the pKa of the reactive hydrogens is at least equal to 4 but is not more than 14, with the exception of lactams.

6. The process according to claim 1, wherein the pKa of the reactive hydrogens is equal to 5.

7. The process according to claim 1, wherein the pKa of the reactive hydrogens is equal to 6.

8. The process according to claim 1, wherein the pKa is not more than 13.

9. The process according to claim 1, wherein the pKa is not more than 12.

10. The process according to claim 1, wherein the pKa is not more than 10.

11. The process according to claim 1, wherein the pH of the aqueous phase is maintained at a value of not more than 12 throughout the reaction.

12. The process according to claim 1, wherein the pH of the aqueous phase is maintained at a value of not more than 11 throughout the reaction.

13. The process according to claim 1, wherein the pH of the aqueous phase is maintained at a value of not more than 10 throughout the reaction.

14. The process according to claim 1, wherein the pH of the aqueous phase is maintained at a value at least equal to the value (pKa-2) throughout the reaction.

15. The process according to claim 1, wherein the pH of the aqueous phase is maintained at a value at least equal to the value (pKa-1) throughout the reaction.

16. The process according to claim 1, wherein the pH of the aqueous phase is maintained at a value at least equal to the pKa value of the blocking agent, or one of the blocking agents, throughout the reaction.

17. The process according to claim 1, wherein the reaction is carried out at a temperature not greater than the cloud point temperature of the surfactant or of a mixture of surfactants used.

18. The process according to claim 1, wherein the composition containing an isocyanate function, contains a solvent, including a mixture of solvents.

19. The process according to claim 1, wherein said step of placing the composition in contact is carried out by stirring with a mixer under conditions which ensure that at least 90% by mass of the particles are between 0.005 and 50 micrometers in size.

20. The process according to claim 18, wherein 95% by mass of the particles are between 0.005 and 50 micrometers in size.

21. The process according to claim 18, wherein the stirring is carried out using a grinding mixer.

22. The process according to claim 1, wherein the reaction mixture is subjected to recirculation.

23. The process according to claim 1, wherein the reaction mixture is subjected to recirculation, during which it is subjected to the action of a grinding mixer.

24. The process according to claim 1, wherein said step of placing the composition in contact is carried out by adding reagent(s) to a stock containing at least one aqueous phase and at least some of the blocking agent(s).

25. The process according to claim 1, wherein said step of placing the composition in contact is carried out by adding reagent(s) to a feed stock containing at least one aqueous phase, at least some of the surfactant(s) and at least some of the blocking agent(s).

26. The process according to claim 1, further comprising:
   b) subjecting the mixture obtained in a) to a shear (speed gradient) of greater than 1000 $s^{-1}$ but less than 1,000,000 $s^{-1}$; and
   c) repeating step b), optionally after step a) has been repeated, until a stable emulsion is obtained whose particles have a Sauter diameter of greater than 0.1 µm but less than 5 µm and a dispersion width of less than 5 µm.

27. The process according to claim 25, wherein the shear (speed gradient) is greater than 20,000 $s^{-1}$.

28. The process according to claim 25, wherein the shear (speed gradient) is less than 200,000 $s^{-1}$.

29. The process according to claim 25, wherein the particles have a Sauter diameter of greater than 2 µm.

30. The process according to claim 25, wherein the particles have a Sauter diameter of less than 2 µm.

31. The process according to claim 26, wherein step c) is continued after adding the isocyanate composition.

32. The process according to claim 26, wherein step c) is carried out by recirculating the emulsion obtained after step b).

33. The process according to claim 26, wherein the reaction mixture is recirculated in a colloidal mill.

34. The process according to claim 33, wherein the aqueous phase, to which the isocyanate-composition, optionally containing at least one of the surfactant and the solvent is added, is subjected to a first shear (speed gradient) of less than 20,000 $s^{-1}$, after placing the composition in contact with the blocking agent and before the high-shear step b).

35. The process according to claim 34, wherein the first shear (speed gradient) is less than 10,000 $s^{-1}$.

36. The process according to claim 1, wherein the process is carried out at a temperature of less than 50° C.

37. The process according to claim 36, wherein the temperature is less than 40° C.

38. The process according to claim 1, wherein all or some of the surfactant is added to the isocyanate composition in a proportion of less than 20% by weight relative to the weight of the isocyanate composition to be blocked.

39. The process according to claim 38, wherein the surfactant is added in a proportion of less than 10% by weight relative to the weight of the isocyanate composition to be blocked.

40. The process according to claim 1, wherein the surfactant is a surfactant containing an anionic function.

41. The process according to claim 1, wherein the said surfactant is an anionic surfactant containing at least one function selected from the group consisting of an aryl phosphate or an alkyl phosphate, an aryl phosphonate, an alkyl phosphonate, and phosphinate.

42. The process according to claim 1, wherein the process includes a compound containing an anionic function and at least one of a polyethylene glycol and polypropylene glycol chain fragment of at least 1 oxyethylene or oxypropylene units.

43. The process according to claim 42, wherein the at least one of polyethylene glycol and polypropylene chain fragments comprise at least 5 oxyethylene or oxypropylene units.

44. The process according to claim 42, wherein the at least one of polyethylene glycol and polypropylene chain fragments comprise at least 7 oxyethylene or oxypropylene units.

45. The process according to claim 1, wherein the compound comprises a hydrophilic part formed of at least one of an anionic function, a polyethylene glycol chain fragment and a polypropylene glycol chain fragment, and a lipophilic part based on a hydrocarbon-based radical.

46. The process according to claim 45, wherein the lipophilic part is selected from the group consisting of an alkyl group and an aryl group.

47. The process according to claim 1, wherein the surfactant is an anionic surfactant and wherein an anionic part of the surfactant corresponds to the following formula:

where q represents zero or 1 where p represents an integer between 1 and 2 (closed intervals i.e. including the limits);

where m represents zero or an integer between 1 and 2 (closed intervals, i.e. including the limits);

where X and X', which are similar or different, represent a divalent radical containing not more than two carbon-based-chain members;

where s is zero or an integer chosen between 1 and 30 (closed intervals, i.e. including the limits);

where n is zero or an integer chosen between 1 and 30 (closed intervals, i.e. including the limits);

where E is phosphorus;

where $R_1$ and $R_2$, which are similar or different, represent a hydrocarbon-based radical.

48. The process according to claim 47, wherein s is an integer between 5 and 25.

49. The process according to claim 47 wherein s is an integer between 9 and 20.

50. The process according to claim 47, wherein n is an integer between 5 and 25.

51. The process according to claim 47, wherein n is an integer between 9 and 20.

52. The process according to claim 47, wherein the hydrocarbon-based radical is an optionally substituted aryl or an optionally substituted alkyl.

53. A method of blocking isocyanates, the method comprising placing an ionic surfactant in contact with at least one blocking agent and an aqueous phase in an emulsion, wherein the surfactant comprise a hydrophilic part containing an anionic function selected from the group consisting of a phosphate, a phosphonate and a phosphinate group, and at least one of a polyethylene glycol chain fragment and a polypropylene glycol chain fragment and a lipophilic part selected from the group consisting of an alkyl group and an aryl group.

54. The method according to claim 53, wherein the surfactant comprises a compound comprising an anionic function and at least one of a polyethylene glycol chain fragment and a polypropylene glycol chain fragment of at least 5 oxyethylene units.

55. The method according to claim 54, wherein the at least one polyethylene glycol chain fragment and polypropylene glycol chain fragment comprise at least 7 oxyethylene units.

56. The method according to claim 54, wherein the compound comprises a hydrophilic part formed of the anionic function, the polyethylene glycol chain fragment, and a lipophilic part based on a hydrocarbon-based radical.

57. The method according to claim 56, wherein the lipophilic part is selected from the group consisting of an alkyl group and an aryl group.

58. The method according to claim 53, wherein the anionic part of the surfactant corresponds to formula I below:

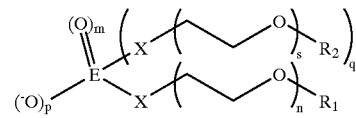

where q represents zero or 1;

where p represents an integer between 1 and 2 (closed intervals i.e. including the limits);

where m represents zero or an integer between 1 and 2 (closed intervals, i.e. including the limits);

where X and X', which are similar or different, represent a divalent radical containing not more than two carbon-based chain members;

where s is zero or an integer chosen between 1 and 30 (closed intervals, i.e. including the limits);

where n is zero or an integer chosen between 1 and 30 (closed intervals, i.e. including the limits);

where E is phosphorus; and where $R_1$ and $R_2$, which are similar or different, represent a hydrocarbon-based radical.

59. The method according to claim 58, wherein s is an integer between 5 and 25.

60. The method according to claim 58, wherein s is an integer between 9 and 20.

61. The method according to claim 58, wherein n is an integer between 5 and 25.

62. The method according to claim 58, wherein n is an integer between 9 and 20.

63. The method according to claim 58, wherein the hydrocarbon-based radical is an optionally substituted aryl or an optionally substituted alkyl.

64. The method according to claim 53, wherein the counter-cation is an amine.

65. The method according to claim 64, wherein the amine is a tertiary amine.

66. The method according to claim 53, wherein the isocyanate composition comprises, on average, 1 to 5 isocyanate functions per molecule bearing isocyanate function(s).

67. The method according to claim 53, wherein the isocyanate composition comprises, on average, 4/3 to 4 isocyanate functions per molecule bearing isocyanate function(s).

68. The method according to claim 53, wherein the blocking agent contains at least one labile hydrogen.

69. The method according to claim 53, wherein the blocking agent contains at least one labile hydrogen and wherein the pKa of the reactive hydrogens is at least equal to 2 but is not more than 11.

70. The method according to claim 69, wherein the pKa of the reactive hydrogens is at least equal to 3.

71. The method according to claim 69, wherein the pKa of the reactive hydrogens is at least equal to 5.

72. The method according to claim 69, wherein the pKa of the reactive hydrogens is not more than 10.

73. The method according to claim 69, wherein the pKa of the reactive hydrogens is not more than 9.

74. The method according to claim 69, wherein the pH of the aqueous phase is maintained at a value of not more than 12 throughout the reaction.

75. The method according to claim 74, wherein the pH is maintained at a value of not more than 11 throughout the reaction.

76. The method according to claim 74, wherein the pH is maintained at a value of not more than 10 throughout the reaction.

77. The method according to claim 53, wherein the pH of the aqueous phase is maintained at a value at least equal to the value (pKa-2) throughout the reaction.

78. The method according to claim 77, wherein the pH is maintained at a value at least equal to the value (pKa-1).

79. The method according to claim 77, wherein the pKa is maintained at a value at least equal to the pKa value of the blocking agent, or one of the blocking agents, throughout the reaction.

80. The method according to claim 77, wherein the mass ratio between the surfactant and the isocyanates is less than 20% and greater than 2%.

81. The method according to claim 80, wherein the mass ratio between the surfactant and the isocyanates is between 4 and 10%.

82. The process according to claim 1, being conducted using a plant comprising:
a shear means, which can generate a shear rate (speed gradient) of greater than 1000 s$^{-1}$ and less than 1,000,000 s$^{-1}$; and
means for injecting an isocyanate composition into an aqueous phase.

83. The process according to claim 82, wherein the shear means is a mill.

84. The process according to claim 83, wherein the mill is a colloidal mill.

85. The process according to claim 82, wherein the shear means can generate a shear rate greater than 20,000 s$^{-1}$.

86. The process according to claim 82, wherein the shear means can generate a shear rate of less than 200,000 s$^{-1}$.

87. The process according to claim 82, further comprising at least one means selected from the group consisting of a means for recirculating the aqueous phase in the form of a blocked polyisocyanate emulsion, a means for regulating the injection flow rate of the isocyanate composition into the aqueous phases, a means for homogenizing the emulsion, a means for cooling the system and a means for removing the aqueous blocked polyisocyanate emulsion.

88. The process according to claim 82, wherein the means for injecting the polyisocyanate composition comprises:

a vat for premixing the polyisocyanate with all or some of the surfactant or the solvent; and
an inlet pipe for the polyisocyanate composition in contact with the blocking agent.

89. The process according to claim 82, wherein the recirculation means comprises a recirculation loop.

90. A composition comprising a blocked polyisocyanate emulsion, comprising a hydrophilic part formed of an anionic function selected from the group consisting of a phosphate, a phosphonate, and a phosphinate group and at least one of a polyethylene glycol chain fragment and a polypropylene glycol chain fragment, and a lipophilic part selected from the group consisting of an alkyl group and an aryl group, wherein the composition comprises less than 50%, by mass, of water relative to the emulsion.

91. Composition according to claim 90, wherein the amount of blocked polyisocyanate(s) in the emulsion represents at least 55% by mass relative to the total mass of the emulsion.

92. Composition according to claim 90, wherein the emulsion is formed of particles having a Sauter diameter less than or equal to 5 µm and a dispersion width less than or equal to 5 µm.

93. The composition according to claim 91, comprising not more than 10%, by mass, of surfactant, relative to the mass of the isocyanate composition.

94. The composition according to claim 90, wherein the surfactant corresponds to the formula:

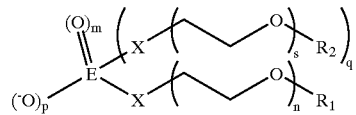

95. The composition according to claim 90, wherein the surfactant corresponds to the formula:

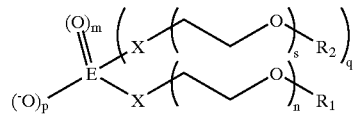

where, when q is zero:

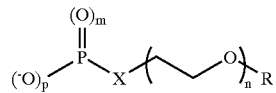

where p represents zero or an integer between 1 and 2 (closed intervals, i.e. including the limits);
where m represents zero or an integer between 1 and 2 (closed intervals, i.e. including the limits);
where the sum p+m+q is not more than three;
where the sum 1p+2m+q is equal to three or five;
where X and X', which are similar or different, represent a divalent radical containing not more than two carbon-based chain members;
where n and s, which are similar or different, represent an integer chosen between 5 and 30 (closed intervals, i.e. including the limits); and
where $R_1$ and $R_2$, which are similar or different, represent a hydrocarbon-based radical.

96. The composition according to claim 95, wherein n and s represent an integer between 5 and 25.

97. The composition according to claim 90, wherein n and s represent an integer between 9 and 20.

98. The composition according to claim 90, having a viscosity of less than 5,500 mPa.s at, at least, 68% solids, at 25° C.

99. The composition according claim 90, having a viscosity of less than 1000 mPa.s at, at least 60% solids, at 25° C.

100. The composition according to claim 90, further comprising a release catalyst.

101. The composition according to claim 100, wherein the release catalyst is a latent atalyst.

102. The composition according to claim 90, further comprising at least one polyol.

103. The composition according to claim 102, wherein the polyol is a nanolatex whose $d_{80}$ is not more than 1 micrometer.

104. The composition according to claim 90, further comprising an isocyanate emulsion whose $d_{80}$ is not more than 10 micrometers.

105. The composition according to claim 90, wherein the water content is between 10 and 70% (oil-in-water emulsion).

106. The composition according to claim 90, wherein the content of isocyanate, emulsifier and alcohol is between 30 and 70%.

107. A process for producing coatings, the process comprising:

applying the composition according to claim 90 in the form of a layer of between 20 µm and 200 µm in thickness; and heating to a temperature of at least 80° C.

108. A coating obtained by the process according to claim 107.

109. The process according to claim 1, wherein the content of free isocyanate functions is equal to not more than about 8% by mass.

110. The process according to claim 109, wherein the content of free isocyanate functions is not more than about 4% by mass.

* * * * *

UNITED STATES PATENT AND TRADEMARK OFFICE
CERTIFICATE OF CORRECTION

PATENT NO. : 6,858,668 B2  
DATED : February 22, 2005  
INVENTOR(S) : Jean-Marie Bernard et al.

Page 1 of 1

It is certified that error appears in the above-identified patent and that said Letters Patent is hereby corrected as shown below:

Column 29,  
Line 33, please delete the current formula, and replace it with the following:

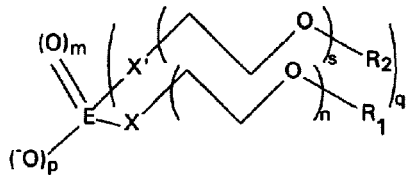

Column 30,  
Line 27, please delete the current formula, and replace it with the following:

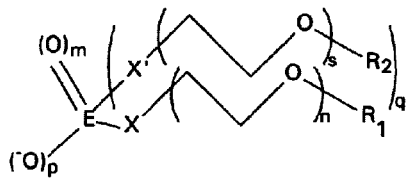

Column 32,  
Lines 29 and 38, please delete the current formula, and replace it with the following:

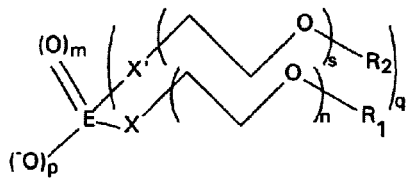

Signed and Sealed this

Twenty-seventh Day of September, 2005

JON W. DUDAS  
*Director of the United States Patent and Trademark Office*